US011870541B1

(12) United States Patent
Rasool et al.

(10) Patent No.: US 11,870,541 B1
(45) Date of Patent: Jan. 9, 2024

(54) FEEDER LINK FOR TRANSPARENT NTN NODES

(71) Applicant: Nokia Solutions and Networks Oy, Espoo (FI)

(72) Inventors: Shahzada Basharat Rasool, Naperville, IL (US); Tzu-Chung Hsieh, Hoffman Estates, IL (US); Rapeepat Ratasuk, Iverness, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/211,634

(22) Filed: Jun. 20, 2023

(30) Foreign Application Priority Data

Jun. 21, 2022 (FI) ..................................... 20225562

(51) Int. Cl.
*H04B 7/185* (2006.01)

(52) U.S. Cl.
CPC ................................ *H04B 7/18513* (2013.01)

(58) Field of Classification Search
CPC ............ H04W 56/0045; H04W 84/06; H04W 56/001; H04W 72/12; H04W 72/23; H04W 74/0833; H04B 7/185; H04B 7/18513; H04B 7/1851
See application file for complete search history.

(56) References Cited

U.S. PATENT DOCUMENTS

2019/0007129 A1*  1/2019 Vargas ................. H04B 7/1858
2020/0351918 A1* 11/2020 Wang .................. H04W 72/0446
2021/0281520 A1*  9/2021 Shrestha ............ H04W 56/0045
2021/0352606 A1  11/2021 Hosseinian et al.
2021/0399797 A1* 12/2021 Khan ..................... H04W 36/30

FOREIGN PATENT DOCUMENTS

| WO | WO 2022/086205 A1 | 4/2002 |
|----|-------------------|--------|
| WO | WO 2021/038429 A1 | 3/2021 |
| WO | WO 2022/086258 A1 | 4/2022 |

OTHER PUBLICATIONS

Nokia et al., "On Feeder Link Mobility in Transparent Satellite Payload Scenarios," 3GPP TSG-RAN WG2 Meeting #113bis, R2-2103334, Elbonia, Apr. 12-20, 2021.
3rd Generation Partnership Project; Technical Specification Group Radio Access Network, "Solutions for NR to support non-terrestrial networks (NTN) (Release 16)," 3GPP TR 38.821 V16.1.0, May 2021.

* cited by examiner

*Primary Examiner* — Khalid W Shaheed
(74) *Attorney, Agent, or Firm* — Harrington & Smith

(57) ABSTRACT

Method including: receiving, on a feeder link, a signal including feeder link slots having a feeder link bandwidth; mapping each of the feeder link slots onto a respective slot-subband in a respective service link slot according to a rule; transmitting, on plural service links, service signals, wherein each of the service signals includes service link slots each including m of the slot-subbands having a same bandwidth; the m slot-subbands do not overlap, are continuous with each other, and cover an entire service link bandwidth of the respective service link slot; wherein the feeder link slots have a feeder link slot duration; the service link slots have a service link slot duration longer than the feeder link slot duration; each of the feeder link slots including respective symbols; each of the slot-subbands includes the symbols of the feeder link slot mapped onto the respective slot-subband.

12 Claims, 12 Drawing Sheets

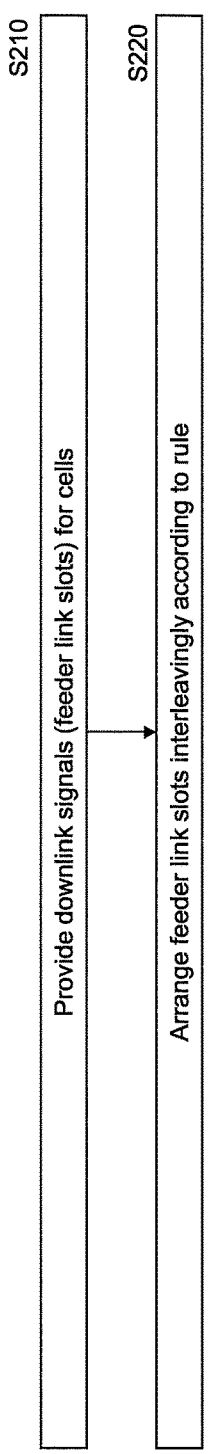
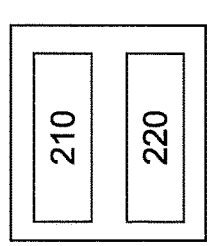
Fig. 12
Fig. 13
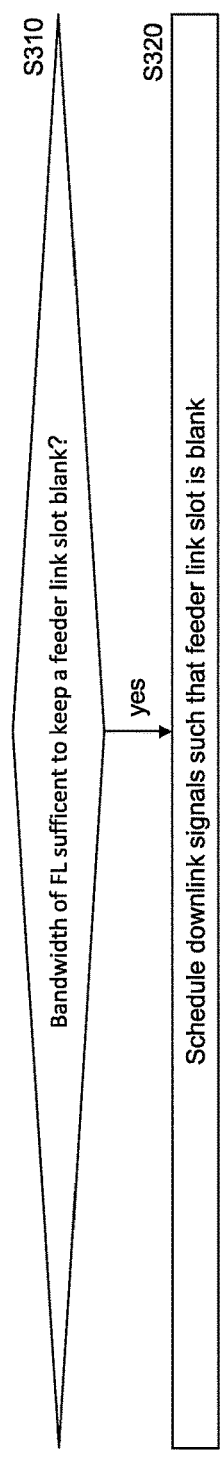
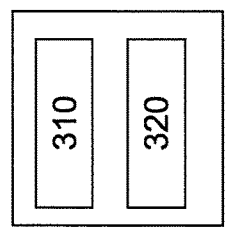
Fig. 14
Fig. 15

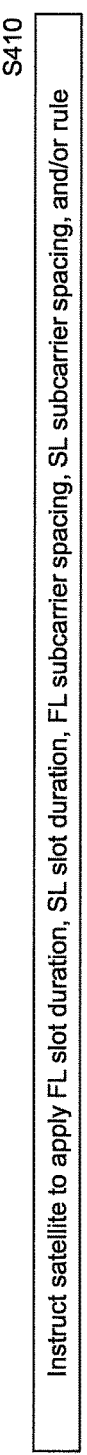
Instruct satellite to apply FL slot duration, SL slot duration, FL subcarrier spacing, SL subcarrier spacing, and/or rule
Fig. 17
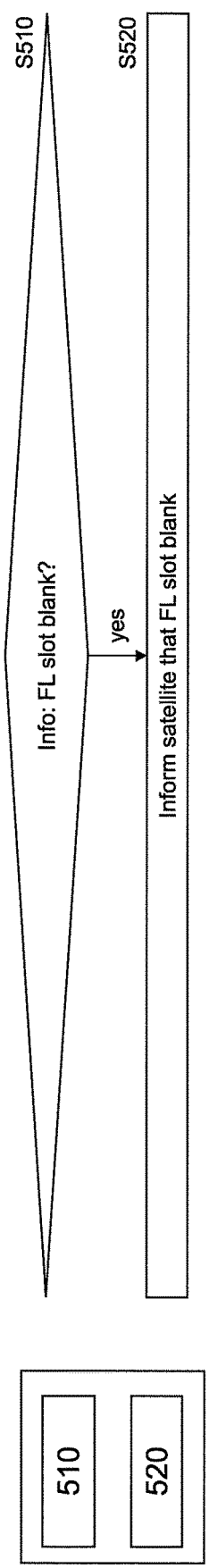
Info: FL slot blank?
yes
Inform satellite that FL slot blank
Fig. 19
| 410 |
|---|
Fig. 16
| 510 |
|---|
| 520 |
Fig. 18
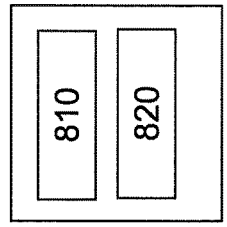
Fig. 20

FEEDER LINK FOR TRANSPARENT NTN NODES

FIELD OF THE INVENTION

The present disclosure relates to non-terrestrial networks, in particular to the feeder link in a NTN.

ABBREVIATIONS

2T2R 2 Transmit-2 Receive (channels)
3GPP 3rd Generation Partnership Project
5G/6G/7G $5^{th}/6^{th}/7^{th}$ Generation
AAS Active Antenna system
ADC Analog to Digital Converter
BBU Baseband Unit
CP Cyclic Prefix
DAC Digital to Analog Converter
DFT Discrete Fourier Transform
DFTS-OFDM DFT-Spread OFDM
DL Downlink direction (from gNB to UE)
eNB eNodeB (LTE base station)
FDD Frequency Division Duplex
FFT Fast Fourier Transform
FL Feeder link; link between HAPS/satellite and ground station
FR1 Frequency Range 1 (sub-6 GHz spectrum in NR)
FR2 Frequency Range 2 (24.25-52.6 GHz in NR)
gNB gNodeB (NR base station)
HAPS High Altitude Platform Station
HARQ Hybrid Automatic Repeat Request
HPA High Power Amplifier
HW Hardware
IFFT Inverse Fast Fourier Transform
IQ In-phase and Quadrature
LEO Low Earth Orbiting
LNA Low Noise Amplifier
LTE Long Term Evolution
MAC Medium Access Control
NR New Radio
NTN Non-Terrestrial Networks
OFDM Orthogonal Frequency Division Multiplexing
PHY Physical layer
P-to-S Parallel-to-serial converter
RACH Random Access Channel
RAN Radio Access Network
RB Resource block
RF Radio Frequency
RIC Radio intelligent controller
RSF Resampling Function
SCS Subcarrier Spacing
SL Service link; communication link between end users (UE) and HAPS (satellite)
S-to-P Serial to Parallel converter
TDD Time Division Duplex
TDM Time Division Multiplex
TN Terrestrial network
TR Technical Report
TS Technical Specification
UE User Equipment
UL Uplink direction (from UE to gNB)

BACKGROUND

HAPS (High Altitude Platform Station) [1] is a communication node deployed in the stratosphere, at altitude 18-24 km, to provide a large coverage area on the ground. The aerial platform for HAPS can be a balloon [2] or an unmanned aircraft [3][4]. Latest technological advances in aeronautics, solar energy, and battery efficiency enables HAPS to stay afloat and continuously operate for several months at a stretch.

Using HAPS and satellites to provide data service to 5G New Radio (NR) user equipment has been explored in 3GPP [5][6]. A non-terrestrial network (NTN) comprising HAPS or satellites can provide services to the vast areas currently not reachable by terrestrial networks and serve maritime and airline transportation industries, as well as providing critical communication for public safety and disaster relief. 3GPP is now working on the specification of NR standard for NTN in Release 17. In this application, the words "satellite" and "HAPS" are used inter-changeably unless otherwise indicated.

FIG. 1 illustrates a deployment scenario of NTN. The "service link" between HAPS/satellite 11 and UE 13 may use 4G LTE or 5G NR air interface to deliver a data service to the UE. The "feeder link" between HAPS/satellites and the ground gateway station 12 transports the aggregated user data to and from the core network. In general, NTN is implemented in either regenerative or bent-pipe (a.k.a. transparent) architecture.

In the regenerative architecture, 4G/5G base station functionality is partially or fully implemented on HAPS/satellite and at least a portion of PHY/MAC processing, such as packet encoding, decoding and/or scheduling, is performed onboard HAPS and satellites. In the bent-pipe architecture, however, the full base station (eNB or gNB) resides in the gateway station, and HAPS or satellites only act as a repeater or relay between the UE and ground station. In that case, the HAPS/satellite only performs frequency conversion and power amplification between service link and feeder link.

NR supports multiple different types of subcarrier spacing (in LTE there is only one type of subcarrier spacing, 15 kHz). The types of NR numerology (specifying the frame structure including subframes, SCS, cyclic prefix, and slots) are specified in 3GPP TS 38.211 [7]. The SCS of different NR numerologies are indicated in Table 1 (Table 4.2-1 of 3GPP TS 38.211).

TABLE 1

Numerologies specified for NR
(adapted from Table 4.2-1 of 3GPP TS 38.211)

| μ | SCS = $\Delta f = 2^\mu \cdot 15$[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

As shown in Table 1, each numerology is labeled by a parameter μ. The numerology (μ=0) represents SCS=15 kHz which is same as LTE. The subcarrier spacing of other μ is derived from (μ=0) by scaling up in the power of 2. The cyclic prefix acts as a buffer region or guard interval (in time domain) to protect the OFDM signals from inter symbol interference. The smaller SCS, the longer is the cyclic prefix (guard interval).

Downlink, uplink, and sidelink transmissions are organized into frames with 10 ms duration, each consisting of ten subframes of 1 ms duration. The number of consecutive OFDM symbols in a slot depends on the cyclic prefix, as shown in Table 2 for a normal cyclic prefix (for extended cyclic prefix, the number of consecutive OFDM symbols in a slot is smaller):

TABLE 2

Number of OFDM symbols per slot ($2^{nd}$ column),
slots per frame ($3^{rd}$ column), and
slots per subframe ($4^{th}$ column) for normal cyclic
prefix for each numerology ($1^{st}$ column)
specified for NR (Table 4.3.2-1 of 3GPP TS 38.211)

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |
| 6 | 14 | 640 | 64 |

A resource block (RB) is the smallest unit of resources that can be allocated to a user. In NR, the resource block is 14 symbols (1 slot) in time domain and 12 sub-carriers in frequency domain.

REFERENCES

[1] https://www.itu.int/en/mediacentre/backgrounders/Pages/High-altitude-platform-systems.aspx.
[2] Loon homepage. https://loon.com/.
[3] HAPS MOBILE. https://wvvw.hapsmobile.com/en/.
[4] Airbus Zephyr. https://www.airbus.com/defence/uav/zephyr.html.
[5] 3GPP TR 38.811, "Study on New Radio (NR) to support non terrestrial networks."
[6] 3GPP TR 38.821, "Solutions for NR to support non-terrestrial networks (NTN)."
[7] 3GPP TS 38.211, "NR Physical channels and modulation"

SUMMARY

It is an object of the present invention to improve the prior art.

According to a first aspect of the invention, there is provided an apparatus comprising:
one or more processors and memory storing instructions that, when executed by the one or more processors, cause the apparatus to perform:
receiving, on a feeder link, a downlink feeder signal comprising, in time domain, feeder link downlink slots having, in frequency domain, a feeder link bandwidth with a feeder link subcarrier spacing;
mapping each of the feeder link downlink slots onto a respective slot-subband in a respective service link downlink slot according to a rule;
transmitting, on each of plural service links, a respective downlink service signal, wherein
each of the downlink service signals comprises, in the time domain, respective one or more of the service link downlink slots;
each of the service link downlink slots comprises, in the frequency domain, m of the slot-subbands with m being a positive integer;
in each of the service link downlink slots, the m slot-subbands are arranged, in the frequency domain, with a same bandwidth and with a service link subcarrier spacing;
in each of the service link downlink slots, in the frequency domain, the m slot-subbands do not overlap, are continuous with each other, and cover an entire service link bandwidth of the respective service link downlink slot; wherein
the feeder link downlink slots have a feeder link slot duration;
the service link downlink slots have a service link slot duration longer than the feeder link slot duration;
the feeder link subcarrier spacing is larger than the service link subcarrier spacing;
each of the feeder link slots comprises respective symbols;
each of the slot-subbands comprises the symbols of the feeder link downlink slot mapped onto the respective slot-subband.

The instructions, when executed by the one or more processors, may cause the apparatus to perform
receiving, on each of the plural service links, a respective uplink service signal; comprising, in the time domain, respective service link uplink slots having, in frequency domain, the service link bandwidth comprising respective m of the slot-subbands arranged with the service link subcarrier spacing;
mapping each of the m slot-subbands in each of the service link uplink slots onto a respective feeder link uplink slot according to the rule;
arranging the feeder link uplink slots in the time domain with the feeder link subcarrier spacing in the frequency domain according to the rule to obtain an uplink feeder signal;
transmitting, on the feeder link, the uplink feeder signal, wherein
each of the uplink service signals comprises, in the time domain, respective one or more of the service link uplink slots;
the feeder link uplink slots have the feeder link slot duration;
the service link uplink slots have the service link slot duration;
each of the service link uplink slots comprises respective symbols;
each of the feeder link uplink slots comprises the symbols of the slot-subband of the service link uplink slot mapped onto the respective feeder link slot.

The instructions, when executed by the one or more processors, may further cause the apparatus to perform the mapping of each slot-subband in each of the service link uplink slots onto the respective feeder link uplink slot by
down-converting the service link uplink slot of the respective slot subband to a baseband uplink service signal;
sampling the baseband uplink service signal with the service link subcarrier spacing to obtain digital uplink samples corresponding to the respective slot-subband;
up-converting and compressing in time the digital uplink samples to obtain the respective feeder link uplink slot.

The feeder link may have a higher carrier frequency than the service links.

The instructions, when executed by the one or more processors, may further cause the apparatus to perform the mapping of each of the feeder link downlink slots onto the respective slot-subband in the respective service link downlink slot by
down-converting the feeder link downlink slot to a baseband downlink feeder signal;

sampling the baseband downlink feeder signal with the feeder link subcarrier spacing to obtain digital downlink samples corresponding to the respective feeder link downlink slot;

for each of the service links:
  determining respective ones of the digital downlink samples according to the rule;
  up-converting and expanding in time the determined digital downlink samples to obtain the respective slot-subband;
  combining the slot-subbands belonging to the respective service link downlink slot according to the rule to obtain the respective service link downlink slot.

The instructions, when executed by the one or more processors, may cause the apparatus to perform the mapping of each of the feeder link downlink slots onto the respective service link downlink slot such that, on each of the service links, the numbering of the respective service link downlink slots is continuous and the respective service link downlink slots are continuous in time on the respective service link.

The instructions, when executed by the one or more processors, may cause the apparatus to perform:
  receiving, on a control link, information about at least one of the feeder slot duration, the service slot duration, the feeder link subcarrier spacing, the service link subcarrier spacing, and the rule for mapping the feeder link downlink slots onto the slot-subbands of the service link downlink slots.

At least one of the feeder slot duration, the service slot duration, the feeder link subcarrier spacing, the service link subcarrier spacing, and the rule for mapping the feeder link downlink slots onto the slot-subbands of the service link downlink slots may be predefined.

The instructions, when executed by the one or more processors, may cause the apparatus to perform:
  detecting whether one of the feeder link downlink slots is blank;
  if the one of the feeder link slots is blank:
    reducing a transmit power of the service link downlink slot on which the one of the feeder link downlink slots is mapped; and
    boosting a power of one or more of the service link downlink slots, wherein the one of the feeder link downlink slots is not mapped on any of the one or more of the service link downlink slots.

The detecting may comprise detecting whether an information is received informing that the one of the feeder link downlink slots is blank.

According to a second aspect of the invention, there is provided an apparatus comprising:
  one or more processors, and memory storing instructions that, when executed by the one or more processors, cause the apparatus to perform:
  providing, for each of plural cells, a respective downlink signal to be transmitted in respective one or more feeder link downlink slots on a feeder link to a satellite;
  arranging the feeder link slots for the plural cells in an interleaving way according to a rule to obtain a feeder link downlink signal to be transmitted on the feeder link.

The rule may indicate that for each of the plural cells, a respective number m of feeder link downlink slots correspond to m slot-subbands in the respective service link downlink slot for the respective cell, m is a positive integer; and the instructions, when executed by the one or more processors, may cause the apparatus to perform for each of the cells:
  arranging the feeder link downlink slots such that the m feeder link downlink slots corresponding to the m subbands in the respective service link downlink slot for the respective cell are subsequent among the feeder link downlink slots for the respective cell;
  for each pair of a slot-subband of a first one of the service link downlink slots for the respective cell and a slot-subband of a second one of the service link downlink slots for the respective cell: if the rule indicates that the first one of the service link downlink slots for the respective cell is arranged earlier in time on the service link between the satellite and the respective cell than the second one of the service link downlink slots for the respective cell, then arranging the feeder link downlink slot corresponding to the slot-subband of the first one of the service link downlink slots for the respective cell earlier in time in the feeder link downlink signal than the feeder link downlink slot corresponding to the slot-subband of the second one of the service link downlink slots for the respective cell.

For at least one of the plural cells, one of the following may apply to the rule:
  either the rule indicates, for each of the service link downlink slots for the respective cell, for each pair of a first slot-subband of the respective service link downlink slot and a second slot-subband of the respective service link downlink slot, if the first slot-subband has a higher subband index than the second slot-subband arranging the feeder link downlink slot corresponding to the first slot-subband earlier in time in the feeder link downlink signal than the feeder link downlink slot corresponding to the second slot-subband;
  or the rule indicates, for each of the service link downlink slots for the respective cell, for each pair of a third slot-subband of the respective service link downlink slot and a fourth slot-subband of the respective service link downlink slot, if the third slot-subband has the higher subband index than the fourth slot-subband arranging the feeder link downlink slot corresponding to the fourth slot-subband earlier in time in the feeder link downlink signal than the feeder link downlink slot corresponding to the third slot-subband.

According to a third aspect of the invention, there is provided an apparatus comprising:
  one or more processors, and memory storing instructions that, when executed by the one or more processors, cause the apparatus to perform:
  monitoring whether a bandwidth of a feeder link is sufficient to send a respective downlink signal to each of plural cells via the feeder link and to keep at least one feeder link slot on the feeder link blank, wherein, for each of the cells, the respective downlink signal is sent on the feeder link in respective one or more feeder link downlink slots;
  scheduling the sending of the downlink signals such that at least one of the feeder link downlink slots is blank if the bandwidth of the feeder link is sufficient.

The instructions, when executed by the one or more processors, may further cause the apparatus to perform:
  informing a controller on the at least one blank feeder link downlink slot.

According to a fourth aspect of the invention, there is provided an apparatus comprising:
- one or more processors, and memory storing instructions that, when executed by the one or more processors, cause the apparatus to perform:
- instructing a satellite to apply at least one of a feeder slot duration on feeder link slots, a service slot duration on service link slots, a feeder link subcarrier spacing, a service link subcarrier spacing, and a rule for mapping the feeder link slots onto the service link slots.

The instructions, when executed by the one or more processors, may cause the apparatus to perform:
- informing a base station on the at least one of the feeder link slot duration and the feeder link subcarrier spacing, wherein the feeder link slots belong to a feeder link signal to be transmitted on a feeder link between the base station and the satellite.

According to a fifth aspect of the invention, there is provided an apparatus comprising:
- one or more processors, and memory storing instructions that, when executed by the one or more processors, cause the apparatus to perform:
- monitoring whether an information is received that at least one of plural feeder link downlink slots on a feeder link is blank;
- informing the satellite that the one of the feeder link downlink slots is blank if the information is received that the one of the feeder link downlink slots is blank.

According to a sixth aspect of the invention, there is provided a method comprising:
- receiving, on a feeder link, a downlink feeder signal comprising, in time domain, feeder link downlink slots having, in frequency domain, a feeder link bandwidth with a feeder link subcarrier spacing;
- mapping each of the feeder link downlink slots onto a respective slot-subband in a respective service link downlink slot according to a rule;
- transmitting, on each of plural service links, a respective downlink service signal, wherein
- each of the downlink service signals comprises, in the time domain, respective one or more of the service link downlink slots;
- each of the service link downlink slots comprises, in the frequency domain, m of the slot-subbands with m being a positive integer;
- in each of the service link downlink slots, the m slot-subbands are arranged, in the frequency domain, with a same bandwidth and with a service link subcarrier spacing;
- in each of the service link downlink slots, in the frequency domain, the m slot-subbands do not overlap, are continuous with each other, and cover an entire service link bandwidth of the respective service link downlink slot; wherein
- the feeder link downlink slots have a feeder link slot duration;
- the service link downlink slots have a service link slot duration longer than the feeder link slot duration;
- the feeder link subcarrier spacing is larger than the service link subcarrier spacing;
- each of the feeder link slots comprises respective symbols;
- each of the slot-subbands comprises the symbols of the feeder link downlink slot mapped onto the respective slot-subband.

The method may further comprise
- receiving, on each of the plural service links, a respective uplink service signal; comprising, in the time domain, respective service link uplink slots having, in frequency domain, the service link bandwidth comprising respective m of the slot-subbands arranged with the service link subcarrier spacing;
- mapping each of the m slot-subbands in each of the service link uplink slots onto a respective feeder link uplink slot according to the rule;
- arranging the feeder link uplink slots in the time domain with the feeder link subcarrier spacing in the frequency domain according to the rule to obtain an uplink feeder signal;
- transmitting, on the feeder link, the uplink feeder signal, wherein
- each of the uplink service signals comprises, in the time domain, respective one or more of the service link uplink slots;
- the feeder link uplink slots have the feeder link slot duration;
- the service link uplink slots have the service link slot duration;
- each of the service link uplink slots comprises respective symbols;
- each of the feeder link uplink slots comprises the symbols of the slot-subband of the service link uplink slot mapped onto the respective feeder link slot.

The mapping of each slot-subband in each of the service link uplink slots onto the respective feeder link uplink slot may comprise
- down-converting the service link uplink slot of the respective slot subband to a baseband uplink service signal;
- sampling the baseband uplink service signal with the service link subcarrier spacing to obtain digital uplink samples corresponding to the respective slot-subband;
- up-converting and compressing in time the digital uplink samples to obtain the respective feeder link uplink slot.

The feeder link may have a higher carrier frequency than the service links.

The method may further comprise the mapping of each of the feeder link downlink slots onto the respective slot-subband in the respective service link downlink slot by
- down-converting the feeder link downlink slot to a baseband downlink feeder signal;
- sampling the baseband downlink feeder signal with the feeder link subcarrier spacing to obtain digital downlink samples corresponding to the respective feeder link downlink slot;
- for each of the service links:
  - determining respective ones of the digital downlink samples according to the rule;
  - up-converting and expanding in time the determined digital downlink samples to obtain the respective slot-subband;
  - combining the slot-subbands belonging to the respective service link downlink slot according to the rule to obtain the respective service link downlink slot.

The mapping of each of the feeder link downlink slots onto the respective service link downlink slot may be performed such that, on each of the service links, the numbering of the respective service link downlink slots is continuous and the respective service link downlink slots are continuous in time on the respective service link.

The method may further comprise:
  receiving, on a control link, information about at least one of the feeder slot duration, the service slot duration, the feeder link subcarrier spacing, the service link subcarrier spacing, and the rule for mapping the feeder link downlink slots onto the slot-subbands of the service link downlink slots.

At least one of the feeder slot duration, the service slot duration, the feeder link subcarrier spacing, the service link subcarrier spacing, and the rule for mapping the feeder link downlink slots onto the slot-subbands of the service link downlink slots may be predefined.

The method may further comprise:
  detecting whether one of the feeder link downlink slots is blank;
  if the one of the feeder link slots is blank:
    reducing a transmit power of the service link downlink slot on which the one of the feeder link downlink slots is mapped; and
    boosting a power of one or more of the service link downlink slots, wherein the one of the feeder link downlink slots is not mapped on any of the one or more of the service link downlink slots.

The detecting may comprise detecting whether an information is received informing that the one of the feeder link downlink slots is blank.

According to a seventh aspect of the invention, there is provided a method comprising:
  providing, for each of plural cells, a respective downlink signal to be transmitted in respective one or more feeder link downlink slots on a feeder link to a satellite;
  arranging the feeder link slots for the plural cells in an interleaving way according to a rule to obtain a feeder link downlink signal to be transmitted on the feeder link.

The rule may indicates that for each of the plural cells, a respective number m of feeder link downlink slots correspond to m slot-subbands in the respective service link downlink slot for the respective cell, m is a positive integer; and the method may further comprise for each of the cells:
  arranging the feeder link downlink slots such that the m feeder link downlink slots corresponding to the m subbands in the respective service link downlink slot for the respective cell are subsequent among the feeder link downlink slots for the respective cell;
  for each pair of a slot-subband of a first one of the service link downlink slots for the respective cell and a slot-subband of a second one of the service link downlink slots for the respective cell: if the rule indicates that the first one of the service link downlink slots for the respective cell is arranged earlier in time on the service link between the satellite and the respective cell than the second one of the service link downlink slots for the respective cell, then arranging the feeder link downlink slot corresponding to the slot-subband of the first one of the service link downlink slots for the respective cell earlier in time in the feeder link downlink signal than the feeder link downlink slot corresponding to the slot-subband of the second one of the service link downlink slots for the respective cell.

For at least one of the plural cells, one of the following may apply to the rule:
  either the rule indicates, for each of the service link downlink slots for the respective cell, for each pair of a first slot-subband of the respective service link downlink slot and a second slot-subband of the respective service link downlink slot, if the first slot-subband has a higher subband index than the second slot-subband arranging the feeder link downlink slot corresponding to the first slot-subband earlier in time in the feeder link downlink signal than the feeder link downlink slot corresponding to the second slot-subband;
  or the rule indicates, for each of the service link downlink slots for the respective cell, for each pair of a third slot-subband of the respective service link downlink slot and a fourth slot-subband of the respective service link downlink slot, if the third slot-subband has the higher subband index than the fourth slot-subband arranging the feeder link downlink slot corresponding to the fourth slot-subband earlier in time in the feeder link downlink signal than the feeder link downlink slot corresponding to the third slot-subband.

According to an eighth aspect of the invention, there is provided a method comprising:
  monitoring whether a bandwidth of a feeder link is sufficient to send a respective downlink signal to each of plural cells via the feeder link and to keep at least one feeder link slot on the feeder link blank, wherein, for each of the cells, the respective downlink signal is sent on the feeder link in respective one or more feeder link downlink slots;
  scheduling the sending of the downlink signals such that at least one of the feeder link downlink slots is blank if the bandwidth of the feeder link is sufficient.

The method may further comprise:
informing a controller on the at least one blank feeder link downlink slot.

According to a ninth aspect of the invention, there is provided a method comprising:
  instructing a satellite to apply at least one of a feeder slot duration on feeder link slots, a service slot duration on service link slots, a feeder link subcarrier spacing, a service link subcarrier spacing, and a rule for mapping the feeder link slots onto the service link slots.

The method may further comprise:
  informing a base station on the at least one of the feeder link slot duration and the feeder link subcarrier spacing, wherein the feeder link slots belong to a feeder link signal to be transmitted on a feeder link between the base station and the satellite.

According to a tenth aspect of the invention, there is provided a method comprising:
  monitoring whether an information is received that at least one of plural feeder link downlink slots on a feeder link is blank;
  informing the satellite that the one of the feeder link downlink slots is blank if the information is received that the one of the feeder link downlink slots is blank.

Each of the methods of the sixth to tenth aspects of the invention may be a method of satellite communication.

According to an eleventh aspect of the invention, there is provided a computer program product comprising a set of instructions which, when executed on an apparatus, is configured to cause the apparatus to carry out the method according to any of the sixth to tenth aspects. The computer program product may be embodied as a computer-readable medium or directly loadable into a computer.

According to some embodiments of the invention, at least one of the following advantages may be achieved:

Transparent satellites/HAPS may support multiple cells even with high throughput;
Communication on feeder link becomes more robust (protection against phase noise);
Service links may have wide coverage;
Modifications on hardware are not required;
Existing NR standards are exploited;
UEs are not impacted;
Enhanced power saving and/or power boosting methods may be used on SL.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 12 shows an apparatus according to an example embodiment of the invention;

FIG. 13 shows a method according to an example embodiment of the invention;

FIG. 14 shows an apparatus according to an example embodiment of the invention;

FIG. 15 shows a method according to an example embodiment of the invention;

FIG. 16 shows an apparatus according to an example embodiment of the invention;

FIG. 17 shows a method according to an example embodiment of the invention;

FIG. 18 shows an apparatus according to an example embodiment of the invention;

FIG. 19 shows a method according to an example embodiment of the invention; and FIG. 20 shows an apparatus according to an example embodiment of the invention.

DETAIL DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Figure 1:
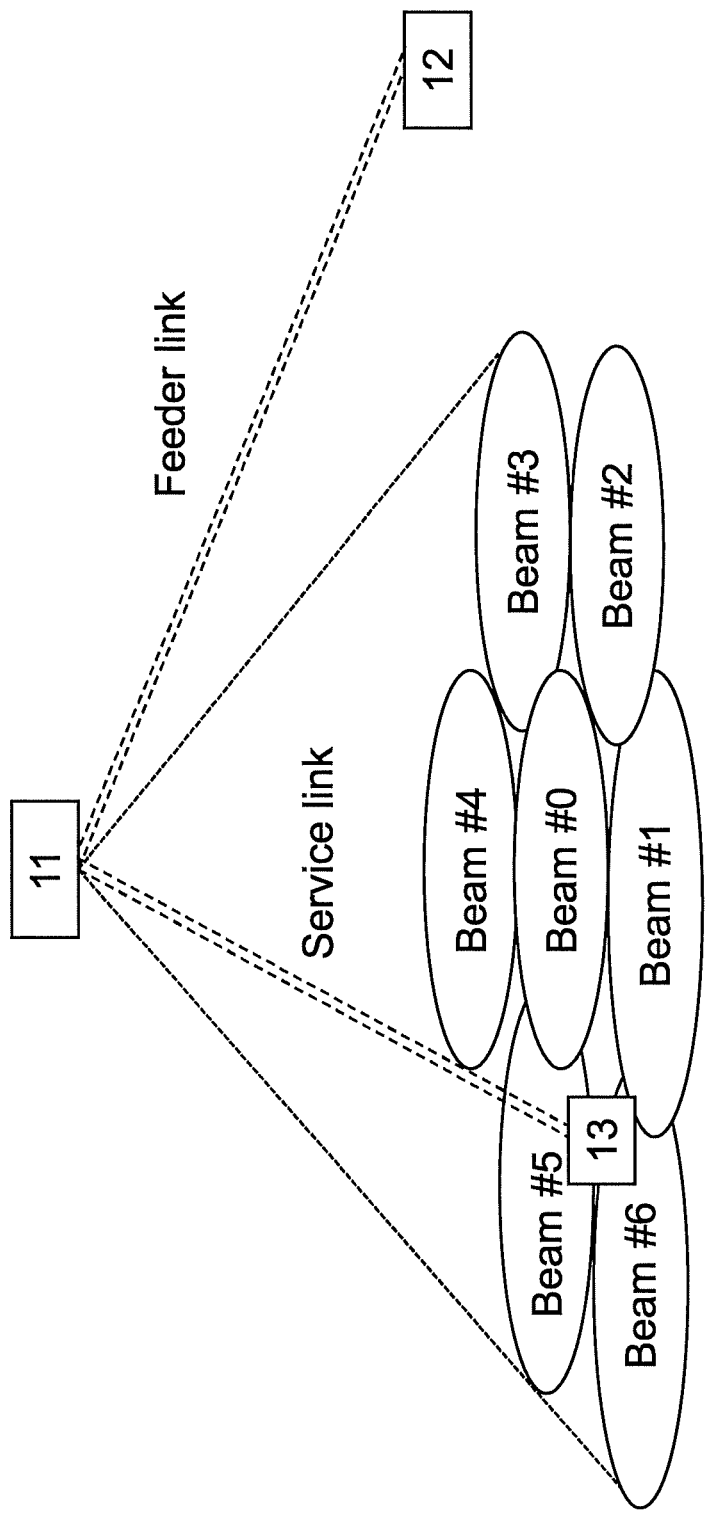
FIG. 1 shows how a HAPS or satellite uses multiple beams for service link coverage.

Lower frequency bands are better suited for wide area coverage due to their lower propagation loss. For mobile data services, HAPS and satellites are expected to use LTE bands or NR Frequency Range 1 (FR1, i.e., sub-6 GHz spectrum) to serve the UEs. Multiple beams are generated by the antenna array on a HAPS or satellite to cover a large service area with the desired antenna gain that enables a high user throughput. A typical scenario is shown in FIG. 1. The footprint of one beam on the ground can range from 20-100 km in diameter for HAPS, and can be even larger for a LEO satellite. With this large beam coverage, the lowest 15 kHz subcarrier spacing (SCS) is the preferred option in the NR OFDM numerology since the corresponding longest cyclic prefix (CP) allows for maximum timing error tolerance.

Figure 2:
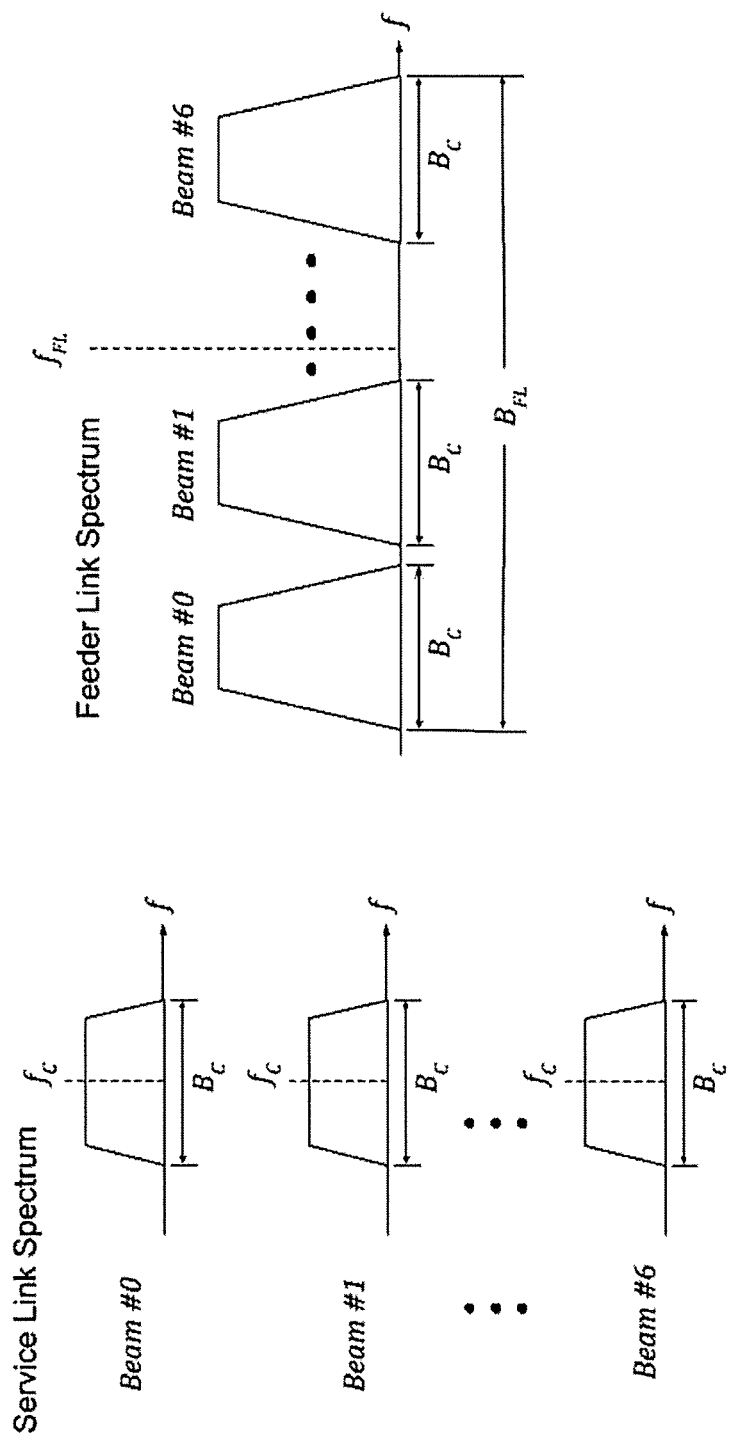
FIG. 2 illustrates spectrum use on service link and feeder link.

On the other hand, the feeder link needs a wide bandwidth to transport the aggregated data from multiple beams to the gateway station. In case of N active beams, each operating over a channel bandwidth $B_C$, the feeder link would require a bandwidth $B_{FL} > NB_C$. This is illustrated in FIG. 2 with an example of seven active beams. Since it is difficult to find large bandwidth in congested lower bands, the feeder link is likely to use the higher frequency spectrum other than the bands for mobile data services.

For regenerative HAPS and satellites, PHY/MAC processing of the service link is implemented on board and the feeder link is independently designed, so frequency band selection for feeder link is flexible. However, for bent-pipe HAPS and satellites, the base station is located on the ground, so the feeder link needs to carry the same LTE/NR waveform used by the UE. To support the same numerology in the service link for wide-area coverage (e.g., 15 kHz SCS), the feeder link must use LTE bands or NR FR1 bands. (Note: NR does not support 15 kHz, 30 kHz SCS in FR2, in the range 24.25-52.6 GHz.) However, those bands do not have sufficient bandwidth to support multiple beams required for a large coverage.

Another alternative is converting the lower frequency LTE/NR waveform (e.g. 15 kHz SCS) to higher frequency in the feeder link, so that the frequency carrier from each beam occupies a subband in the higher frequency spectrum as shown in FIG. 2. This approach, however, is also problematic since the RF signal at high frequency (e.g. in mmWave bands) is susceptible to phase noise and Doppler effect induced distortions. The LTE/NR waveform of a small SCS modulated on a high frequency carrier can be severely corrupted.

Some example embodiments of the invention enable the feeder link to use a high frequency band (e.g. >6 GHz, e.g. FR2) with a different SCS than for the service links to support multiple lower frequency carriers on service links for LTE or NR mobile data service provided by HAPS or satellites.

Some example embodiments of the invention involve a special processing of baseband IQ data at the satellite end (or on HAPS) of the feeder link. This allows the feeder link to have wider SCS (and service link to work with smaller SCS) and ability to use wider bandwidth available in high frequency bands. With the increased SCS, the feeder link signal will be robust against the channel distortion and phase noise in the high frequency spectrum.

Some aspects of example embodiments of the invention are summarized hereinafter. Some example embodiments of the invention may use only one or more of these aspects, while other example embodiments may use all of these aspects.

1. Feeder link may use high frequency bands in FR2 with larger SCS (e.g., 120 or 240 kHz).
2. Service link deploys smaller SCS (15 or 30 kHz) than feeder link.
3. Service link may employ FR1 to enable better coverage performance. Service link has M beams where each beam may be mapped to a single cell in service link (or multiple cells in time-multiplexed fashion).
4. The satellite circuitry at the NTN satellite maps LTE or NR slots from high frequency feeder link into different beams on the service link.
   a. The mapping of feeder link slots to service link slots (and vice versa) is done according to a rule in a precise manner to preserve NR frame structure, subcarrier spacing and carrier bandwidth on service link.
   b. A separate control (management) link may instruct the mapping by the satellite according to the rule, and/or the mapping or part of the mapping may be based on a predefined rule.
5. Satellite may map feeder link slots both on a TDM and/or FDM basis. This may be configured through a management link or predefined.
   a. If only TDM mapping of feeder link slots onto service link beams (slots) is employed, satellite may process the incoming feeder link slots as they arrive (no buffering capacity needed at satellite)
   b. If buffering functionality of slots is available on the satellite (or HAPS), then feeder link slots may also be mapped in an FDM fashion (see FIG. 7). In this case, satellite will buffer the incoming feeder link slots and will forward them when all subcarriers (for a given service link beam mapping) have been received. Equivalently, on the uplink, buffering will be used to map some subcarriers to different location in feeder link slots.
   c. The configuration of slots conveyed by the management link may be effected by operator policies and available FL bandwidth and number of SL cells.
6. The bandwidth of each service link slot may be divided into m subbands (SL slot-subbands) with a same bandwidth, where m is a positive integer. In the frequency domain, the SL slot-subbands of a slot do not overlap and are continuous with each other such that they cover the entire bandwidth of the SL slot. If m=1, the service link slot is not divided into different SL slot subbands. Each of the feeder link slots may be mapped to a service link slot-subband in a 1:1 relationship. Thus, if m>1, multiple feeder link slots may be mapped to one SL slot and vice versa (FDM mapping).
7. In some example embodiments, the UE on the service link does not see any frame/slot jump. However, from gNB perspective, for scheduling a given cell and slot numbering and timing relationships, some slots are barred for the specific UE. Therefore, some software on gNB may be modified over conventional software (e.g., slot and frame numbering, timing relations). Nevertheless, a change in gNB HW (AAS) is typically not required. gNB/NTN gateway may use existing TN gNB HW. Gateway and gNB may be packaged in one box or may be separate boxes.

Figure 3:
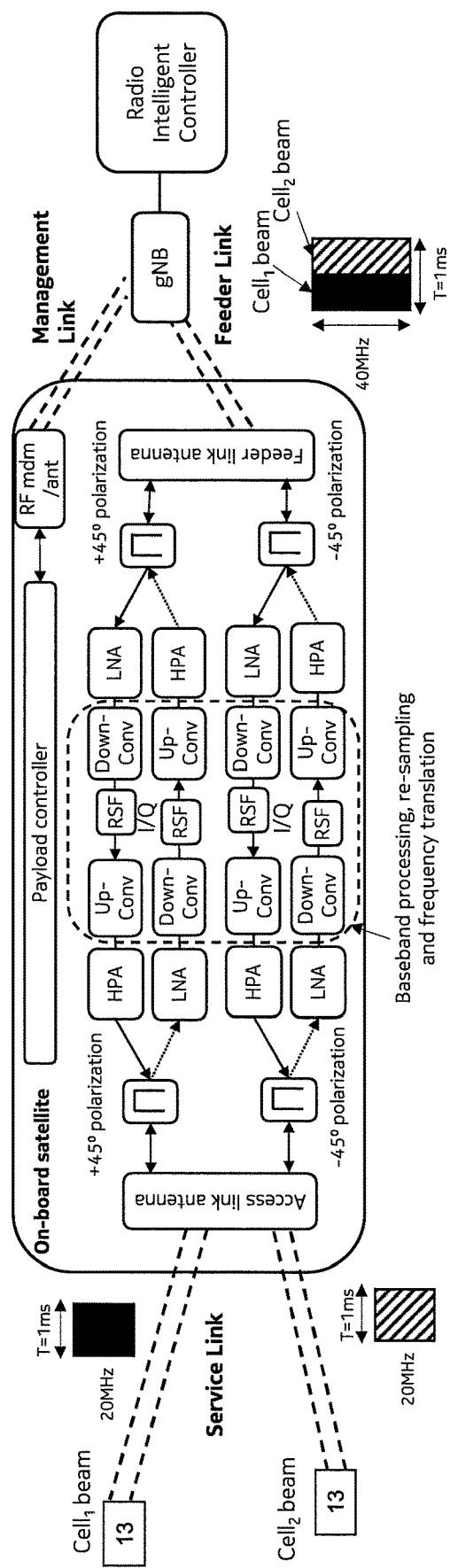
FIG. 3 shows a block diagram of a HAPS/satellite payload for one 2T2R service link cell with 15 kHz SCS and feeder link with 30 kHz SCS according to some example embodiments of the invention.

FIG. 3 shows a satellite circuit according to some example embodiments of the invention. In the example embodiment, the feeder link uses 30 kHz SCS, and the service link uses 15 kHz SCS. In this example embodiment, a single 40 MHz feeder link channel (i.e. having a bandwidth of 40 MHz) can support two 20 MHz service link beams or cells (i.e. each having a bandwidth of 20 MHz). At the satellite, in DL direction of the service link (i.e. from satellite to UE), digital samples from the FL, which are taken during T/2 time are transmitted during time T, which reduces bandwidth of signals by a factor of 2. A corresponding relationship holds in the UL direction (from UE via satellite to gNB), where digital samples from one service link taken during time T are transmitted over the feeder link during T/2.

In the example embodiment of FIG. 3, satellite only processes even slots (0.5 ms duration) on feeder link for one cell and ignores odd slots for the one cell. In the DL direction, the samples from the even slot of duration 0.5 ms (taken at a rate twice of what is needed on service link) are transmitted over 1 ms which effectively compresses the bandwidth of the OFDM waveform by 2. In the UL direction, for every 1 ms long slot, and using 15 kHz SCS, samples taken over a slot are transmitted over the feeder link in 0.5 ms time, which expands the bandwidth of the signal on the feeder link, corresponding now to 30 kHz SCS. A $2^{nd}$ 2T2R cell may have the same circuitry but that circuit will process only odd slots on the feeder link and ignores even slots on the feeder link.

In FIG. 3, payload controller depicts the control or management link (via RF modem and antenna module "RF mdm/ant") that can program the satellite circuitry for feeder link to service link slot mapping (this control link may use a separate radio link).

Note that the control or management link is optional. Instead, some or all of the parameters of the mapping may be predefined. If a control signal is received for one of the predefined parameters, the control signal may have prevalence over the predefined value of the parameter or vice versa, depending on implementation.

The mapping is performed by the re-sampling function (RSF) on the baseband, after the received signals are amplified and down-converted, and before they are up-converted and amplified. In detail:

DL: Satellite receives 30 kHz SCS signal with 0.5 ms slot duration (2 slots in a subframe of T=1 ms). After down-conversion to baseband, digital samples, sampled at a rate matching the slot duration of the FL, taken during time 0.5 ms (during T/2), are transmitted on the service link during 1 ms interval (during time T, 1 slot of 1 ms in a subframe of T=1 ms) after up-conversion.

UL: Satellite receives 15 kHz SCS signal with 1 ms slot duration. After down-conversion to baseband, digital samples, sampled at service link data rate matching the slot duration of the SL, taken during 1 ms (during time T), are transmitted on the feeder link within 0.5 ms (during time T/2) after up-conversion.

A memory function may help to collect samples on the UL side as samples are collected for transmission onto the feeder link (FL).

That is, after re-sampling, mapping is done on a FL slot by FL slot basis instead of mapping on a symbol by symbol basis. Digital samples, sampled at a rate matching the slot duration of the FL (taken during time 0.5 ms, or during T/2, in this example) are transmitted on the service link using a rate matching the slot duration of the service link (during 1 ms interval, or during time T) after up-conversion. A memory can be used to collect samples and then transmit later. Fourier Transform properties then ensure that sample time dilation (compression) results in bandwidth compression (dilation) by the same proportion.

Scaling of Subcarrier Spacing (SCS)

Let $T_s$ be the sample time for the feeder link transmission, so the sample rate is $R=1/T_s$. Also let T' and $\Delta f$ be respectively the OFDM symbol time and the subcarrier spacing (SCS). One OFDM symbol therefore contains $N_s=T'/T_s$ contiguous samples and the n-th complex sample ($0 \leq n < N_s$) is represented by $$x(n) = \sum_{k=0}^{N_{FFT}-1} a_k e^{j2\pi k \Delta f n T_s}$$

, where $N_{FFT}$ is the FFT size and $a_k$ the modulated data symbol on the k-th subcarrier.

The samples of OFDM symbols remain unchanged, but the $N_s$ samples of one symbol from the feeder link are modulated over a duration N*T', where in this particular example, N=2. This means that for the SL, the new effective sampling rate is $0.5*R=1/(2T_s)$, corresponding to a new sampling time $T'_s=2T_s$. The underlying FFT size (number of subcarriers) does not change. In particular, the n-th sample ($0 \leq n < N_s$) on one of the service link can be represented as $$x(n) = \sum_{k=0}^{N_{FFT}-1} a_k e^{j2\pi k \Delta f' n T'_s}$$

where $\Delta f'=0.54\Delta f$. The new SL waveform has half the SCS and twice the symbol time.

As mentioned above, some example embodiments of the invention encompass baseband signal processing at the satellite end of the feeder link. In the below description, first an example embodiment of an NTN gNB with two service link cells (or beams) is described, each one having the same bandwidth and subcarrier spacing. Further below, this particular case will be generalized to multiple cells in service link.

Figure 4:
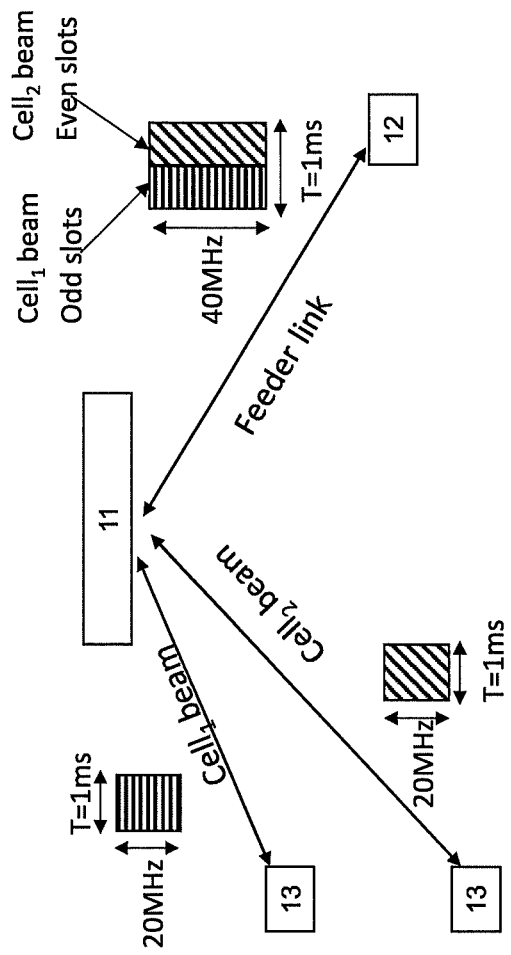
FIG. 4 shows an example of two cells in service link according to some example embodiments of the invention.

As shown in FIG. 4, there is an NTN system (or HAPS) with 2 NR cells in service link, each service link slot having 20 MHz bandwidth and 15 kHz subcarrier spacing. With this configuration FL must support 212 RB every 1 ms and maintain slot timing relationships. In FL, a TDM like mapping of slots is deployed, where each service beam is time multiplexed, and FL uses a larger SCS. Thus, gNB uses 40 MHz wide channel for the FL with 30 kHz SCS.

For the DL transmission from gNB to UE, satellite receives wideband feeder signal, down-converts it to baseband, takes digital samples at sampling rate matching the FL rate (slot duration on the FL), stores samples in memory, modulates, and forwards on to service link cells. Respective digital samples, which are taken during T/2 time on FL are transmitted during time T on each of the service links, which reduces bandwidth of signals by a factor of 2. In this example embodiment, service link cells are treated as beam directions for scheduling purposes. Even slots go to $cell_1$ and odd slots go to $cell_2$.

From gNB perspective, there is a scheduling constraint. $Cell_1$ can only be scheduled in even slots and $cell_2$ only in odd slots. In some example embodiments, there is no such limitation from UE perspective, since UE does not see any frame/slot discontinuity. Namely, UE receives a service signal with 15 kHz SCS and 1 ms slot duration, while gNB sends alternately, for each of the UEs, a respective signal with 30 kHz SCS and 0.5 ms slot duration.

Since there is a difference in slot numbering from UE and gNB perspective, due to re-sampling (multiplexing/demultiplexing) at satellite, gNB may re-number the slots so that UEs, in respective cells, do not see a jump in slot numbering or any missing slot in the NR frame structure. This may result in changes to gNB scheduler and associated update of timing constraints (i.e., HARQ timing, RACH timing etc.) to reflect this renumbering. These changes do not affect the RF waveform and are simply data carried by the RF signals.

Figure 5:
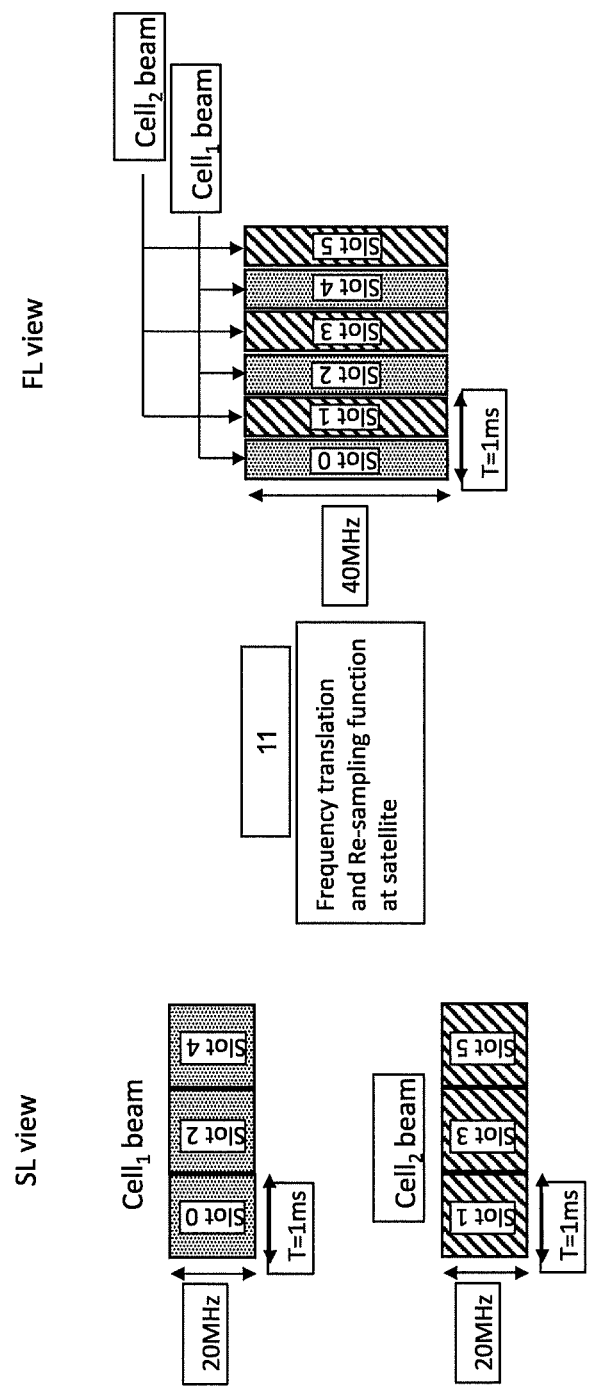
FIG. 5 illustrates a FL view and a SL view of slots for a two-cell-system according to some example embodiments of the invention.
Figure 6:
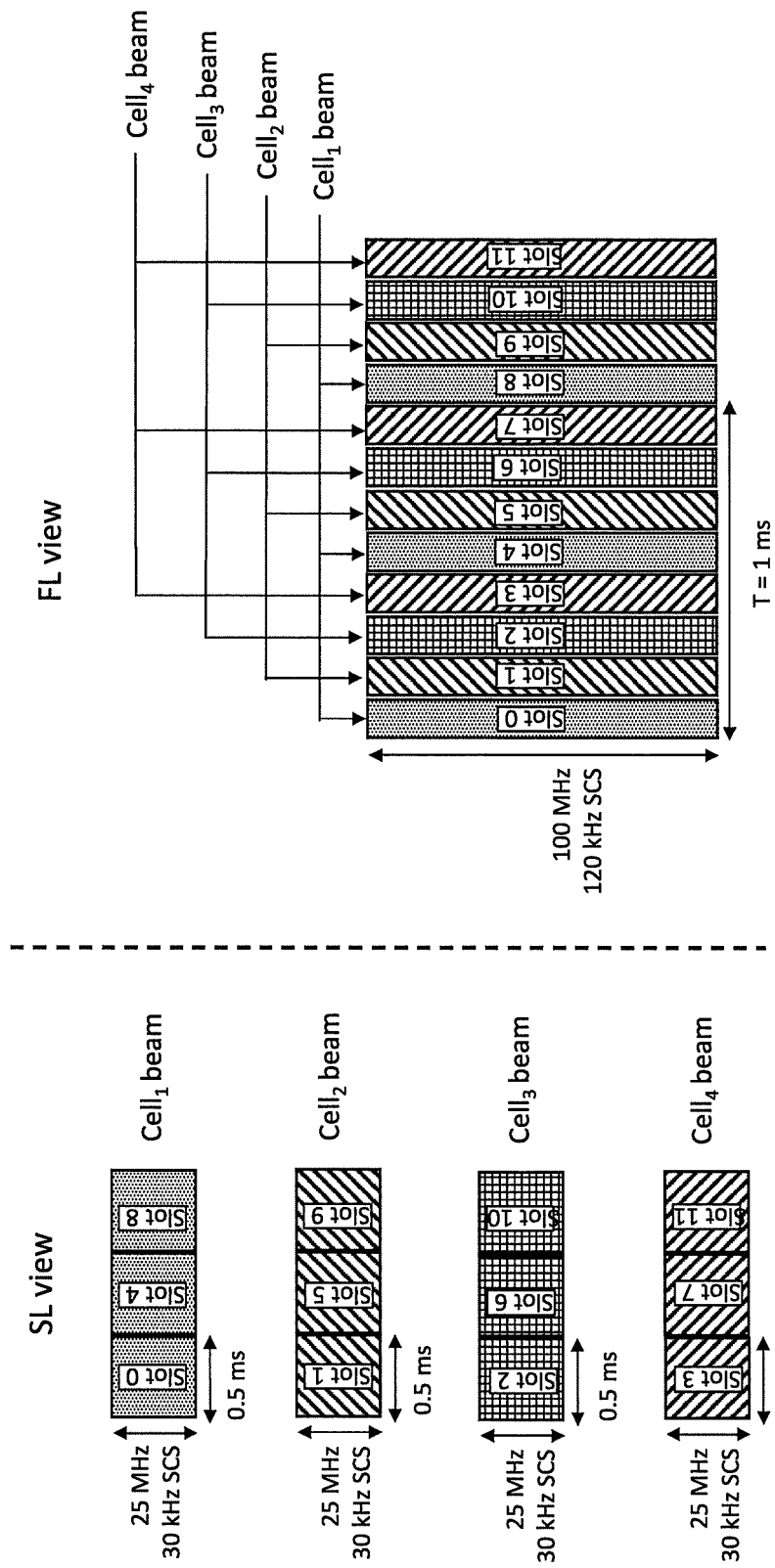
FIG. 6 shows feeder link transmission using 100 MHz bandwidth with 120 kHz SCS according to some example embodiments of the invention.
Figure 7:
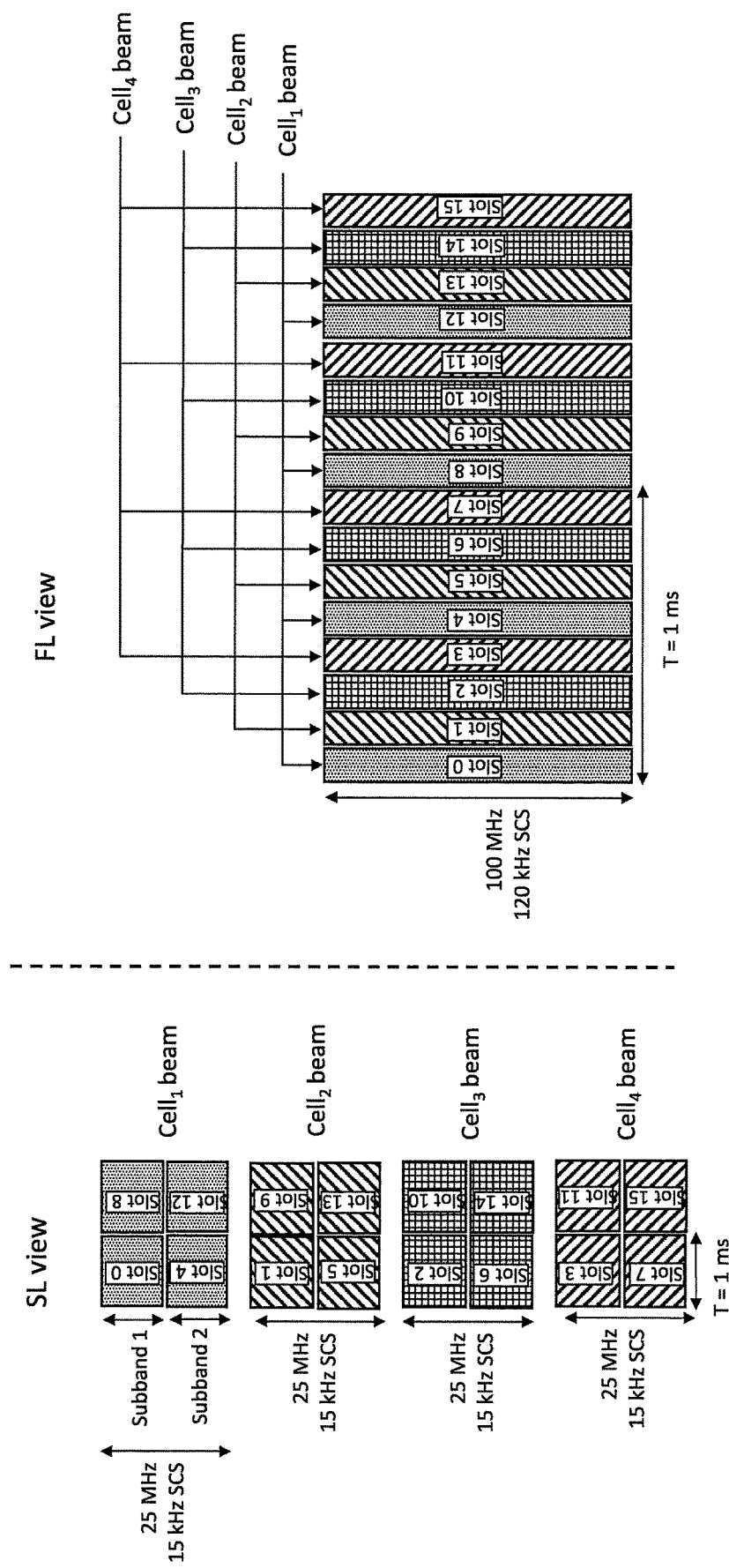
FIG. 7 shows feeder link transmission using 100 MHz bandwidth with 120 kHz SCS to support 4 service links using both TDM and FDM mapping of slots according to some example embodiments of the invention.

In the uplink transmission, from the UE to gNB, a corresponding functionality is used: satellite receives slots from the service links and interleaved slots are transmitted down on the FL to the satellite gateway. FIG. 5 shows how the slots are mapped from FL to SL and from SL to FL. This compression of slots (respectively OFDM symbols) in time on the FL increases the SCS of FL waveform and makes the use of mmWave spectrum on FL feasible. In FIGS. 5 to 7, both the feeder link slots and the service link slots (or service link slot-subbands in FIG. 7) are numbered according to the numbering on the feeder link. Actually, on the service links, the slots may be renumbered such that the numbering of the service link slots on each service link is consecutive. For example, on the left side of FIG. 5, the denotation of the service link slots for cell1 ("slot 0", "slot 2", "slot 4") indicates that the signals in Cell1 service link come from FL slot 0, FL slot 2, FL slot 4, but these signals are mapped to SL slot 0, SL slot 1, SL slot 2.

According to some example embodiments, the gNB knows this FL to SL slot mapping when performing scheduling, so that SL slots will appear continuous to a UE. For example in FIG. 5, if a UE in cell 1 is allocated SL slots 0 and 1, the gNB has to transmit signals for that UE in FL slots 0 and 2.

Re-sampling Function (RSF) [see FIG. 3 and FIG. 5]

A function of the re-sampling function may be described as multiplexing/demultiplexing on the satellite to correctly map the service link slots (or slot-subbands) on the feeder link slots and vice versa. During this multiplexing/demultiplexing, digital samples are either compressed (from SL to FL) or expanded in time (from FL to SL) which changes frequency content of the signal.

DL: In the case of two SL cells, satellite receives 30 kHz SCS signal with 0.5 ms slot duration. After down-conversion to baseband, digital samples (sampled at rate matching the feeder link data rate) taken during T/2 (here 0.5 ms), are transmitted on the service link during time T (1 ms interval) after up-conversion. From Fourier transform properties, dilation in time corresponds to compression of the spectrum by the same factor. $N_1$ digital samples taken during 0.5 ms, using sampling rate $f_1$, are converted to analog signal spanning 1 ms.

UL: Satellite receives 15 kHz SCS OFDM signal with 1 ms slot duration (14 OFDM symbols). After down-conversion to baseband, digital samples, taken at rate matching the SL data rate, received during time T (1 ms here) are transmitted on the feeder link within T/2 (0.5 ms here) after up-conversion.

An advantage of a method of some example embodiments of the invention is that a change in gNB HW (AAS) is not required. gNB and NTN gateway can be placed in one box. Only software changes are needed (e.g., frame numbering, timing relations) in higher layers.

Extension to Multiple Cells in Service Link

Hereinafter, some aspects of this invention are discussed, especially how TDM and FDM mapping of slots is accomplished.

FL to SL Translation.

The feeder link (FL) characteristics (available bandwidth, SCS) determine the available capacity for service links in terms of the available bandwidth and SCS of SL cells. For example, the following principles may be used for FL to SL mapping.

1. On FL side, the mapping between SL and FL is done on a FL slot-by-FL slot basis. On SL side, the mapping is done on SL slot-by-SL slot basis or on SL slot-subband-by-SL slot-subband basis.
2. The mapping pattern may be configured over a period of one subframe (1 ms in NR and LTE). Then, SL-to-FL mapping may be the same for different subframes.
3. If P is number of RBs per service link cell in one 1 ms and there are N service link cells, then feeder link bandwidth should be such that it can support $\geq$N*P RBs in 1 ms.
4. If FL is using higher SCS, (e.g., 120 kHz or 240 kHz) and has $P_f$ resource blocks per slot, then the number of RBs in a slot for a given SL cell, denoted by number $P_s$ is such as $$P_s \leq \text{floor}\left(\frac{k}{N}P_f\right),$$

where N is the number of simultaneously served service link cells (or beams) and k is ratio of SCS of FL to SCS of SL, $$k = \frac{SCS \text{ of } FL}{SCS \text{ of } SL}.$$

a. Using the above relation, and SCS of SL, the bandwidth of SL can be determined.

Tables 3 and 4 show examples for different service link (SL) bandwidths and mappings for a 100 MHz wide feeder link NR carrier. FIGS. 6 and 7 depict how the mapping is performed for different configurations.

The number of RBs per FL slot ($P_f$) and the number of RBs per SL slot of one cell ($P_s$) has this relation: $P_s$=m $P_f$, where m is a positive integer. When m=1, one SL slot for one cell can be mapped exactly to one FL slot, and the mapping may be carried out in a TDM fashion for N cells. FL slots for the same cell are interleaved every N slots in the feeder link as shown in FIG. 6.

In case m>1, the bandwidth of $P_s$ RBs in the SL is divided up to m subbands (slot-subbands), each with $P_f$ RBs. Since one slot-subband in the SL has the same number of RBs as in the FL, one slot-subband in one SL slot can be exactly mapped to one FL slot. The m slot-subbands in one SL slot will be mapped to m FL slots. This frequency domain slot mapping can be carried out over the N-slot interleaving structure for the same cell in the FL. The successive m slot-subbands in the same SL slot may be mapped according to a given order (e.g. successively) to the interleaving FL slots of that cell. An example is illustrated in FIG. 7, where SL bandwidth consists of two subbands (m=2) and four cells (N=4) are multiplexed on the FL slots.

TABLE 3

100 MHz FL mappings for different combinations of SL and SCS.

| SL slot configuration: 25 MHz*, 15 kHz | SL slot configuration: 10 MHz, 15 kHz | SL slot configuration: 25 MHz, 30 KHz | SL slot configuration: 50 MHz*, 30 kHz | FL slot configuration: 100 MHz, 120 kHz SCS |
|---|---|---|---|---|
| 133 RB, 1 ms | 52 RB, 1 ms | 65 RB, 0.5 ms | 133 RB, 0.5 ms | $P_f$ = 66 RB, 0.125 ms per slot with 8 slots in 1 ms. |
| 4 cells in SL, N = 4, k = 8, $P_s \leq$ 132 | 8 cells in SL, N = 8, k = 8, $P_s \leq$ 66 | 4 cells in SL, N = 4, k = 4, $P_s \leq$ 66 | 2 cells in SL, N = 2, k = 4, $P_s \leq$ 132 | |

*If (from avaialble feeder link slots) two slots per ms are allocated to each service link, 100 MHz wide FL can only support 132 RB. 1 RB is not used in SL.

TABLE 4

50 MHz FL mappings for different combinations of SL and SCS.

| SL slot configuration: 5 MHz 15 kHz | SL slot configuration: 10 MHz 15 kHz | SL slot configuration: 25 MHz* 30 kHz | FL slot Configuration: 50 MHz, 120 kHz SCS |
|---|---|---|---|
| 25 RB, 1 ms | 52 RB, 1 ms | 65 RB, 0.5 ms | $P_f$ = 32 RB, 0.125 ms per slot with 8 slots in 1 ms |
| 8 cells in SL N = 8, k = 8, $P_s \leq$ 32 | 4 cells in SL N = 4, k = 8, $P_s \leq$ 64 | 2 cells in SL N = 2, k = 4, $P_s \leq$ 64 | |

*If two slots per ms are allocated to each SL, 50 MHz wide FL can only support 64 RB. 1 RB is not used in SL.

FIGS. 6 and 7 depict how the mapping is performed for different configurations using 100 MHz FL bandwidth and 120 kHz SCS with 66 RB and 0.125 ms slot duration. The right side of each of these figures shows how feeder link (FL) slots are mapped over service link beams. In FIG. 6, the FL supports 4 service link (SL) cells. Each SL uses 25 MHz bandwidth and 30 kHz SCS with 65 RB and 0.5 ms slot duration. In this case, m=1, one SL slot is mapped to one FL slot. Over a 0.5 ms period, one SL slot from each of the 4 cells is mapped to a FL slot in a TDM fashion, i.e., 4 SL slots from 4 cells are interleaved on 4 successive FL slots. Of the 66 available RBs in a FL slot, only 65 are used for SL data. The $66^{th}$ RB could be left blank or used for time/frequency alignment between feeder link and gateway station.

In FIG. 7, the FL supports 4 SL cells. Each service link uses 25 MHz bandwidth and 15 kHz SCS with 133 RB and 1 ms slot duration. In this case, m=2, i.e., one SL slot comprises two SL slot-subbands. The two SL slot-subbands of one SL slot are mapped to two FL slots. Each of the two SL slot-subbands comprises 66 RBs. Here slots on the feeder link are multiplexed in both TDM and FDM fashion to efficiently use available spectrum. Over a 1 ms period, two subbands of one SL slot from each of the 4 cells are mapped to two successive interleaving FL slots for that cell. Note that in NR standards, 25 MHz bandwidth has 133 RB for 15 kHZ SCS. However, here only 132 RB are available in SL, since FL can support only 132 RB for this mapping scheme (66*2=132, see Table 3).

As shown in the examples of FIGS. 5 to 7, typically the rule describing the mapping between FL slots and SL slots or SL slot-subbands indicates that FL slots earlier in time on the FL signal correspond to SL slots earlier in time on the respective SL slot. In detail, typically the rule indicates that for each of the plural cells, a respective number m of feeder link downlink slots correspond to m slot-subbands in the respective service link downlink slot for the respective cell, m is a positive integer; to arrange the feeder link downlink slots such that the m feeder link downlink slots corresponding to the m subbands in the respective service link downlink slot for the respective cell are subsequent among the feeder link downlink slots for the respective cell; and for each pair of a slot-subband of a first one of the service link downlink slots for the respective cell and a slot-subband of a second one of the service link downlink slots for the respective cell: if the rule indicates that the first one of the service link downlink slots for the respective cell is arranged earlier in time on the service link between the satellite and the respective cell than the second one of the service link downlink slots for the respective cell, then arrange the feeder link downlink slot corresponding to the slot-subband of the first one of the service link downlink slots for the respective cell earlier in time in the feeder link downlink signal than the feeder link downlink slot corresponding to the slot-subband of the second one of the service link downlink slots for the respective cell.

In addition, typically, the sequence in time of the FL slots corresponding to one SL slot for a cell may correspond to the sequence of subband indices of the slot-subbands. In detail: typically, either the rule indicates, for each of the service link downlink slots for the respective cell, for each pair of a first slot-subband of the respective service link downlink slot and a second slot-subband of the respective service link downlink slot, if the first slot-subband has a higher subband index than the second slot-subband arranging the feeder link downlink slot corresponding to the first slot-subband earlier in time in the feeder link downlink signal than the feeder link downlink slot corresponding to the second slot-subband; or the rule indicates, for each of the service link downlink slots for the respective cell, for each pair of a third slot-subband of the respective service link downlink slot and a fourth slot-subband of the respective service link downlink slot, if the third slot-subband has the higher subband index than the fourth slot-subband arranging the feeder link downlink slot corresponding to the fourth slot-subband earlier in time in the feeder link downlink signal than the feeder link downlink slot corresponding to the third slot-subband.

As shown in FIG. 3, a separate management link (control link, connected to payload controller in the figure) may be used to program FL and SL slot mapping and timing. For a given feeder link bandwidth configuration, different options for SL SCS and number of SL cells, as described above, can be implemented using the management link. In addition, this link can be used for timing and frequency alignment at the satellite.

Enhanced Power Boosting and Power Saving on Service Links

Figure 8:
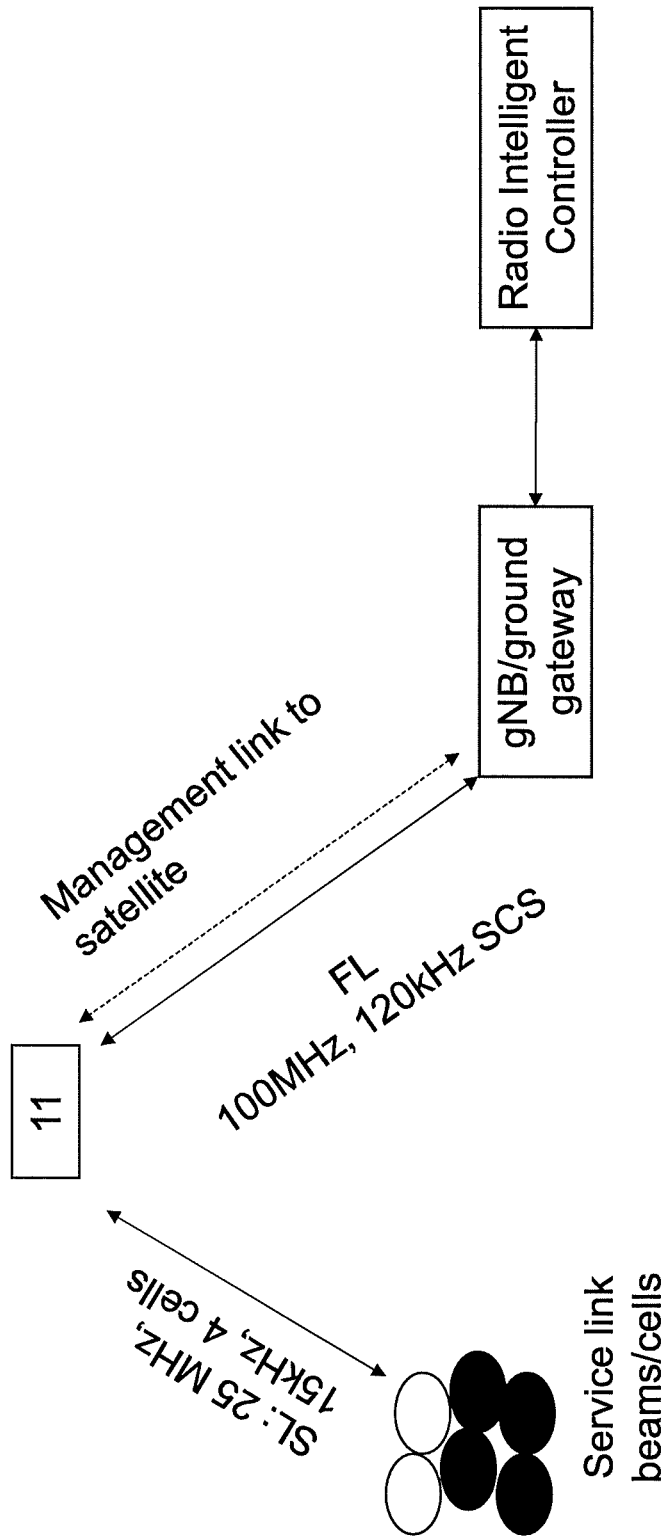
FIG. 8 shows an example where the bandwidth on the feeder link is not sufficient to support all cells in the service link.

In some example embodiments of the invention, active slot mapping can be used to vary bandwidth of cells in the SL. This may be useful when there are more cells (or beams) in the SL than the FL bandwidth can support, but the cells (or beams) have low loading or are idle. An example is shown in FIG. 8. This is especially useful if some buffering functionality is available on the satellite (which is anyway needed for FDM type of slot mapping).

In detail, FIG. 8 illustrates an example where FL is designed to support 4 cells in SL (as specified in first column of Table 3), but there are six cells to be served on the service link side. In this case, if resource utilization is low, then gNB/ground gateway (under direction from radio intelligent controller or some other RAN management function) and satellite can be configured with the slot configuration as specified in $2^{nd}$ column from left of Table 3. Since there are only six cells to be served on the SL, 2 slots on the FL are set as blank. The management link carries this configuration from gNB via ground gateway to the satellite.

The management link (or control link) may carry information from the ground gateway to the satellite informing about power boosting (e.g. no boosting, prioritized boosting, etc.). To aid in the power boosting, the network can be configured to transmit some common signals like SSB, SIB1, on the beams such that either they all occur at the same time (or subframe) or at different times (or subframes).

Figure 9:
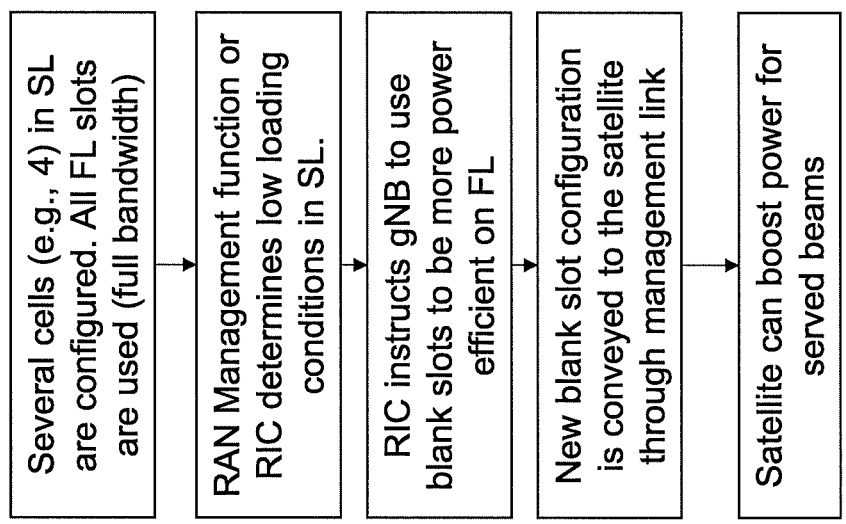
FIG. 9 shows an algorithm for power saving in FL and power boosting in SL according to some example embodiments of the invention.

Power boosting may be applied also in a scenario where FL bandwidth can support all SL cells (or beams) but due to low load, some beams in the SL are not transmitted by the satellite, as indicated by the gateway (gNB) through management link. In particular, the operation of the scheduler can be optimized (through a radio intelligent controller or other RAN management function) to create blank subfarmes (i.e. try to group the signals to all UEs together in the same subframes for a given SL cell or beam). As an example, if a configuration shown in FIG. 7 is used where FL supports 4 cells in the SL, and the loading on some cells is low, then selective blanking of slots can be employed by the gNB to optimize power. In this case, satellite is able to blank the respective SL cell transmissions and re-allocate available power to active SL beams. The boosted power can be used to better serve cell edge UEs, or to improve the demodulation performance of UEs. The power re-allocation and blanking can be conveyed by the management link or inferred by the satellite when it receives blank slots on the FL. An algorithm is depicted in FIG. 9. Note that creation of blank subframes is preferred for dynamic power re-allocation since the gNB can more efficiently coordinate power boosting among the different SLs.

Figure 11:
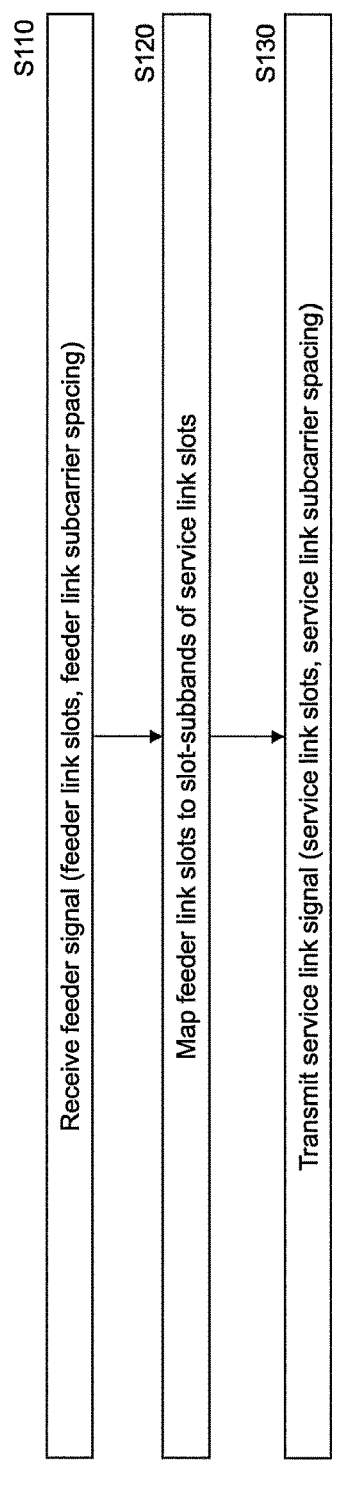
FIG. 11 shows a method according to an example embodiment of the invention.
Figure 10:
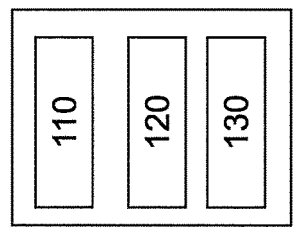
FIG. 10 shows an apparatus according to an example embodiment of the invention.

FIG. 10 shows an apparatus according to an example embodiment of the invention. The apparatus may be a satellite (or HAPS) or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for receiving 110, means for mapping 120, and means for transmitting 130. The means for receiving 110, means for mapping 120, and means for transmitting 130 may be a receiving means, mapping means, and transmitting means, respectively. The means for receiving 110, means for mapping 120, and means for transmitting 130 may be a receiver, mapper, and transmitter, respectively. The means for receiving 110, means for mapping 120, and means for transmitting 130 may be a receiving processor, mapping processor, and transmitting processor, respectively.

The means for receiving 110 receives, on a feeder link, a downlink feeder signal (S110). The downlink feeder signal comprises, in time domain, feeder link downlink slots having, in frequency domain, a feeder link bandwidth with a feeder link subcarrier spacing. The feeder link downlink slots have a feeder link slot duration. Each of the feeder link slots comprises respective symbols.

The means for mapping 120 maps each of the feeder link downlink slots onto a respective slot-subband in a respective service link downlink slot according to a rule (S120). The service link downlink slots have a service link slot duration. The service link slot duration is longer than the feeder link slot duration. Each of the slot-subbands comprises the symbols of the feeder link downlink slot mapped onto the respective slot-subband.

The means for transmitting 130 transmits, on each of plural service links, a respective downlink service signal (S130). Each of the downlink service signals comprises, in the time domain, respective one or more of the service link downlink slots. Each of the service link downlink slots comprises, in the frequency domain, m of the slot-subbands with m being a positive integer. In each of the service link downlink slots, the m slot-subbands are arranged, in the frequency domain, with a same bandwidth and with a service link subcarrier spacing. In each of the service link downlink slots, in the frequency domain, the m slot-subbands do not overlap, are continuous with each other, and cover an entire service link bandwidth of the respective service link downlink slot. The feeder link subcarrier spacing is larger than the service link subcarrier spacing.

FIG. 12 shows an apparatus according to an example embodiment of the invention. The apparatus may be a base station (e.g. gNB, eNB) or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for providing 210 and means for arranging 220. The means for providing 210 and means for arranging 220 may be a providing means and arranging means, respectively. The means for providing 210 and means for arranging 220 may be a provider and arranger, respectively. The means for providing 210 and means for arranging 220 may be a providing processor and arranging processor, respectively.

The means for providing 210 provides, for each of plural cells, a respective downlink signal (S210). The respective downlink signal is to be transmitted in respective one or more feeder link downlink slots on a feeder link to a satellite.

The means for arranging 220 arranges the feeder link slots for the plural cells in an interleaving way according to a rule (S220). Thus, the means for arranging obtains a feeder link downlink signal. The feeder link downlink signal may be transmitted on the feeder link.

FIG. 14 shows an apparatus according to an example embodiment of the invention. The apparatus may be a base station (e.g. gNB, eNB) or an element thereof. FIG. 15 shows a method according to an example embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for monitoring 310 and means for scheduling 320. The means for monitoring 310 and means for scheduling 320 may be a monitoring means and scheduling means, respectively. The means for monitoring 310 and means for scheduling 320 may be a monitor and scheduler, respectively. The means for monitoring 310 and means for scheduling 320 may be a monitoring processor and scheduling processor, respectively.

The means for monitoring 310 monitors whether a bandwidth of a feeder link is sufficient to send a respective downlink signal to each of plural cells via the feeder link and to keep at least one feeder link slot on the feeder link blank (S310). For each of the cells, the respective downlink signal is sent on the feeder link in respective one or more feeder link slots.

If the bandwidth of the feeder link is sufficient (S310=yes), the means for scheduling 320 schedules the sending of the downlink signals such that at least one of the feeder link slots is blank (S320).

The apparatus of FIG. 14 may be the same apparatus as the apparatus of FIG. 12. The method of FIG. 15 may include the method of FIG. 13 or vice versa.

FIG. 16 shows an apparatus according to an example embodiment of the invention. The apparatus may be controller or an element thereof. FIG. 17 shows a method according to an example embodiment of the invention. The apparatus according to FIG. 16 may perform the method of FIG. 17 but is not limited to this method. The method of FIG. 17 may be performed by the apparatus of FIG. 16 but is not limited to being performed by this apparatus.

The apparatus comprises means for instructing 410. The means for instructing 410 may be a instructing means. The means for instructing 410 may be an instructor. The means for instructing 410 may be an instructing processor.

The means for instructing 410 instructs a satellite to apply at least one of a feeder slot duration on feeder link slots, a service slot duration on service link slots, a feeder link subcarrier spacing between the feeder link slots, a service link subcarrier spacing between the service link slots, and a rule for mapping the feeder link slots onto the service link slots (S410).

FIG. 18 shows an apparatus according to an example embodiment of the invention. The apparatus may be controller or an element thereof. FIG. 19 shows a method according to an example embodiment of the invention. The apparatus according to FIG. 18 may perform the method of FIG. 19 but is not limited to this method. The method of FIG. 19 may be performed by the apparatus of FIG. 18 but is not limited to being performed by this apparatus.

The apparatus comprises means for monitoring 510 and means for informing 520. The means for monitoring 510 and means for informing 520 may be a monitoring means and informing means, respectively. The means for monitoring 510 and means for informing 520 may be a monitor and informer, respectively. The means for monitoring 510 and means for informing 520 may be a monitoring processor and informing processor, respectively.

The means for monitoring 510 monitors whether an information is received (S510). The information informs that at least one of plural feeder link slots on a feeder link is blank. If the information is received that the one of the feeder link slots is blank (S510=yes), the means for informing 520 informs the satellite that the one of the feeder link slots is blank (S520).

The apparatus of FIG. 18 may be the same apparatus as the apparatus of FIG. 16. The method of FIG. 19 may include the method of FIG. 17 or vice versa.

FIG. 20 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least the method according to at least one of FIGS. 11, 13, 15, 17, and 19 and related description.

Some example embodiments are explained with respect to a 5G network. However, the invention is not limited to 5G. It may be used in other communication networks using satellites or HAPS, too, where different numerologies may be applied on the feeder link and the service link, e.g. in forthcoming generations of 3GPP networks such as 6G or 7G, etc., or in modified versions of previous 3GPP networks such as 4G. In particular, the invention is not limited to the numerologies currently specified for NR. Other numerologies may be employed in addition or instead of the numerologies specified for NR.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality. The same applies correspondingly to the terminal.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a satellite or a HAPS, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a RAN node (such as a base station, e.g. gNB or eNB, etc.) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a controller or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The phrase "at least one of A and B" comprises the options only A, only B, and both A and B. The terms "first X" and "second X" include the options that "first X" is the same as "second X" and that "first X" is different from "second X", unless otherwise specified.

The invention claimed is:

1. Apparatus, comprising:
   one or more processors; and
   one or more non-transitory memories storing instructions that, when executed with the one or more processors, cause the apparatus to perform:
   receiving, on a feeder link, a downlink feeder signal comprising, in time domain, feeder link downlink slots having, in frequency domain, a feeder link bandwidth with a feeder link subcarrier spacing;
   mapping the feeder link downlink slots onto a respective slot-subband in a respective service link downlink slot according to a rule; and
   transmitting, on plural service links, a respective downlink service signal, wherein
   the downlink service signals comprise, in the time domain, respective one or more of the service link downlink slots;
   the service link downlink slots comprise, in the frequency domain, m of the slot-subbands with m being a positive integer;
   in the service link downlink slots, the m slot-subbands are arranged, in the frequency domain, with a same bandwidth and with a service link subcarrier spacing; and
   in the service link downlink slots, in the frequency domain, the m slot-subbands do not overlap, are continuous, and cover an entire service link bandwidth of the respective service link downlink slot; wherein
the feeder link downlink slots have a feeder link slot duration;
the service link downlink slots have a service link slot duration longer than the feeder link slot duration;
the feeder link subcarrier spacing is larger than the service link subcarrier spacing;
the feeder link slots comprise respective symbols; and
the slot-subbands comprise the symbols of the feeder link downlink slot mapped onto the respective slot-subband.

2. The apparatus according to claim 1, wherein the instructions, when executed with the one or more processors, cause the apparatus to perform
receiving, on the plural service links, a respective uplink service signal; comprising, in the time domain, respective service link uplink slots having, in frequency domain, the service link bandwidth comprising respective m of the slot-subbands arranged with the service link subcarrier spacing;
mapping the m slot-subbands in the service link uplink slots onto a respective feeder link uplink slot according to the rule;
arranging the feeder link uplink slots in the time domain with the feeder link subcarrier spacing in the frequency domain according to the rule to obtain an uplink feeder signal; and
transmitting, on the feeder link, the uplink feeder signal, wherein
the uplink service signals comprise, in the time domain, respective one or more of the service link uplink slots;
the feeder link uplink slots have the feeder link slot duration;
the service link uplink slots have the service link slot duration;
the service link uplink slots comprise respective symbols; and
the feeder link uplink slots comprise the symbols of the slot-subband of the service link uplink slot mapped onto the respective feeder link slot.

3. The apparatus according to claim 2, wherein the instructions, when executed with the one or more processors, further cause the apparatus to perform the mapping of the slot-subbands in the service link uplink slots onto the respective feeder link uplink slot with
down-converting the service link uplink slot of the respective slot subband to a baseband uplink service signal;
sampling the baseband uplink service signal with the service link subcarrier spacing to obtain digital uplink samples corresponding to the respective slot-subband; and
up-converting and compressing in time the digital uplink samples to obtain the respective feeder link uplink slot.

4. The apparatus according to claim 1, wherein the feeder link has a higher carrier frequency than the service links.

5. The apparatus according to claim 1, wherein the instructions, when executed with the one or more processors, further cause the apparatus to perform the mapping of the feeder link downlink slots onto the respective slot-subband in the respective service link downlink slot with
down-converting the feeder link downlink slot to a baseband downlink feeder signal;
sampling the baseband downlink feeder signal with the feeder link subcarrier spacing to obtain digital downlink samples corresponding to the respective feeder link downlink slot;
for the service links:
determining respective ones of the digital downlink samples according to the rule;
up-converting and expanding in time the determined digital downlink samples to obtain the respective slot-subband; and
combining the slot-subbands belonging to the respective service link downlink slot according to the rule to obtain the respective service link downlink slot.

6. The apparatus according to claim 1, wherein the instructions, when executed with the one or more processors, cause the apparatus to perform the mapping of the feeder link downlink slots onto the respective service link downlink slot such that, on the service links, the numbering of the respective service link downlink slots is continuous and the respective service link downlink slots are continuous in time on the respective service link.

7. The apparatus according to claim 1, wherein the instructions, when executed with the one or more processors, cause the apparatus to perform:
receiving, on a control link, information about at least one of the feeder slot duration, the service slot duration, the feeder link subcarrier spacing, the service link subcarrier spacing, or the rule for mapping the feeder link downlink slots onto the slot-subbands of the service link downlink slots.

8. The apparatus according to claim 1, wherein
at least one of the feeder slot duration, the service slot duration, the feeder link subcarrier spacing, the service link subcarrier spacing, or the rule for mapping the feeder link downlink slots onto the slot-subbands of the service link downlink slots is predefined.

9. The apparatus according to claim 1, wherein the instructions, when executed with the one or more processors, cause the apparatus to perform:
detecting whether one of the feeder link downlink slots is blank;
if the one of the feeder link slots is blank:
reducing a transmit power of the service link downlink slot on which the one of the feeder link downlink slots is mapped; and
boosting a power of one or more of the service link downlink slots, wherein the one of the feeder link downlink slots is not mapped on any of the one or more of the service link downlink slots.

10. The apparatus according to claim 9, wherein the detecting comprises detecting whether an information is received informing that the one of the feeder link downlink slots is blank.

11. Method, comprising:
receiving, on a feeder link, a downlink feeder signal comprising, in time domain, feeder link downlink slots having, in frequency domain, a feeder link bandwidth with a feeder link subcarrier spacing;
mapping the feeder link downlink slots onto a respective slot-subband in a respective service link downlink slot according to a rule; and
transmitting, on plural service links, a respective downlink service signal, wherein
the downlink service signals comprise, in the time domain, respective one or more of the service link downlink slots;

the service link downlink slots comprise, in the frequency domain, m of the slot-subbands with m being a positive integer;

in the service link downlink slots, the m slot-subbands are arranged, in the frequency domain, with a same bandwidth and with a service link subcarrier spacing; and in the service link downlink slots, in the frequency domain, the m slot-subbands do not overlap, are continuous, and cover an entire service link bandwidth of the respective service link downlink slot; wherein the feeder link downlink slots have a feeder link slot duration;

the service link downlink slots have a service link slot duration longer than the feeder link slot duration;

the feeder link subcarrier spacing is larger than the service link subcarrier spacing;

the feeder link slots comprise respective symbols; and the slot-subbands comprise the symbols of the feeder link downlink slot mapped onto the respective slot-subband.

12. A computer program product comprising a non-transitory medium with a set of instructions which, when executed on an apparatus, is configured to cause the apparatus to carry out the method according to claim 11.

\* \* \* \* \*